United States Patent Office.

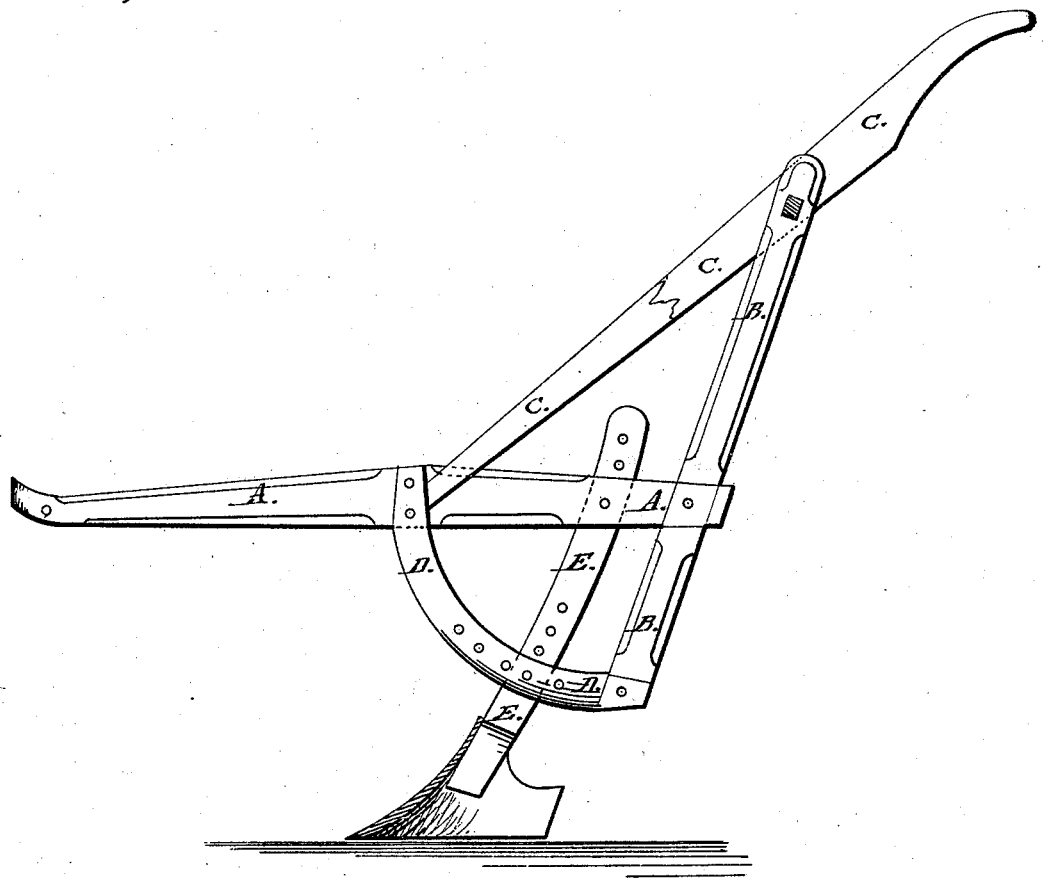

DANIEL H. HILL, OF UNION SPRINGS, ALABAMA.

Letters Patent No. 91,631, dated June 22, 1869.

IMPROVEMENT IN PLOW.

The Schedule referred to in these Letters Patent and making part of the same

*To all whom it may concern:*

Be it known that I, DANIEL H. HILL, of Union Springs, in the county of Bullock, and State of Alabama, have invented a new and useful Improvement in Plows; and I do hereby declare that the following is a full, clear, and exact description thereof, which will enable others skilled in the art to make and use the same, reference being had to the accompanying drawing, forming part of this specification.

The figure is a side view of my improved plow.

My invention has for its object to improve the construction of plow-frames, so as to make them stronger and lighter than the frames constructed in the ordinary manner, while at the same time causing them to run lighter and steadier; and It consists in the slotted circular arm, constructed and arranged in combination with the beam, upright, and standard, as hereinafter more fully described.

A is the plow-beam, to the rear end of which is attached the upright B, which projects both above and below the beam A, as shown in the figure.

C are the handles, which are attached to the plow-beam A, and are connected with the upper end of the upright B by a cross-bar, or round, as shown in the figure.

D is a curved bar, slotted longitudinally, made in the form of a quarter of a circle, and the ends of which are attached to the beam A, and to the lower end of the upright B, as shown in the figure.

E is the standard, to the lower end of which the plow is attached.

The standard E passes up through the slot in the curved bar D, and through the slot in the beam A.

The standard E is secured to the beam A by a pin, or bolt, passing through a hole in said beam, and through one or the other of the holes through the said standard E.

The standard E is adjustably secured to the curved slotted bar D, by a pin, or bolt passing through one or the other of the holes in the said standard E, and through one or the other of the holes, through the said curved bar D, as shown in the drawing, so that the plow may be set at any desired pitch, or to run at any desired depth in the ground.

Having thus described my invention,

What I claim as new, and desire to secure by Letters Patent, is—

The curved slotted bar D, constructed and arranged in combination with the beam A, upright B, and standard E, substantially as herein shown and described, and for the purpose set forth.

DANIEL H. HILL.

Witnesses:
B. P. GERMANY,
R. B. McDONALD.